United States Patent [19]

Heller

[11] 4,117,669
[45] Oct. 3, 1978

[54] APPARATUS AND METHOD FOR REDUCING THERMAL STRESS IN A TURBINE ROTOR

[75] Inventor: Jack A. Heller, Shaker Heights, Ohio

[73] Assignee: The United States of America as represented by the Administrator of the National Aeronautics and Space Administration, Washington, D.C.

[21] Appl. No.: 776,029

[22] Filed: Mar. 4, 1977

[51] Int. Cl.² .............................. F02C 7/26; F01B 5/18
[52] U.S. Cl. .................................... 60/39.14; 415/115; 415/116
[58] Field of Search ................ 60/39.14, 39.36, 39.37; 415/115, 116, 117, 12; 416/95

[56] References Cited

U.S. PATENT DOCUMENTS

| | | | |
|---|---|---|---|
| 1,164,091 | 12/1915 | Herz | 60/39.39 |
| 2,685,421 | 8/1945 | Klose | 60/39.36 |
| 2,977,760 | 4/1961 | Soltav et al. | 60/39.36 |
| 3,267,676 | 8/1966 | Sneeden | 60/39.36 |
| 3,316,714 | 5/1967 | Smith et al. | 60/39.36 |
| 3,446,481 | 5/1969 | Kydd | 415/416 |
| 3,975,901 | 8/1976 | Hollinger et al. | 415/115 |

*Primary Examiner*—Louis J. Casaregola
*Attorney, Agent, or Firm*—N. T. Musial; J. R. Manning; J. A. Mackin

[57] ABSTRACT

A gas turbine is provided wherein the thermal stresses in the turbine rotor are reduced. The rotor includes a central disc with a peripheral rim, and a plurality of blades extending radially outwardly from the rim, and to reduce thermal stresses, a duct arrangement is provided which selectively directs hot gases from the turbine combustor to the rim during the turbine start-up. The hot gases from the combustor serve to heat the rim, and thus decease the start-up period necessary to bring the temperature profile of the rotor into the operating temperature range. After the start-up period, the duct arrangement is then used to direct cool gases from the turbine compressor to the rim of the rotor in order to maintain a lower rotor equilibrium temperature.

12 Claims, 2 Drawing Figures

APPARATUS AND METHOD FOR REDUCING THERMAL STRESS IN A TURBINE ROTOR

ORIGIN OF THE INVENTION

This invention was made by an employee of the United States Government and may be manufactured or used by or for the Government without the payment of any royalties thereon or therefor.

BACKGROUND OF THE INVENTION

1. Field of the Invention

This invention relates to gas turbine and, more particularly, to an arrangement for reducing thermal stresses in turbine rotors.

2. Description of the Prior Art

Present day gas turbines includes rotors characteristically comprising a central disc or hub having a peripheral rim and a plurality of blades extending radially outwardly from the rim. In general, the rotors are cast or forged as an integral unit and the blades are relatively small and thin in comparison with the central disc. Because of this construction, a steep temperature gradient exists at the junction of the blades and the rim during turbine start-up because the relatively small thin blades reach an equilibrium temperature much faster than the rim. This steep temperature gradient produces local thermal stresses which can lead to a reduction in the useful life of the rotor. Another factor that adversely affects rotor life is the maximum allowable turbine inlet temperature, with higher, more efficient temperature shortening the life of the rotor.

In order to reduce the effects of thermal stresses and therefore extend the useful life of such rotors, the rotors are designed with ultra-conservative, allowable stress limits. Such designs require relatively heavy rotors, and the use of such heavy rotors increases manufacturing costs and can also effect turbine operational efficiency.

A number of patents deal with problems relating to turbine temperatures and employ heating and cooling techniques in attempting to solve these problems. For example, U.S. Pat. No. 966,588 (Parsons) discloses a technique of heating turbine parts wherein the turbine spindle is heated to maintain predetermined clearances. U.S. Pat. No. 3,903,691 (Szydlowski) discloses a technique for avoiding the formation of thermal imbalance in turbine engines wherein compressed air is injected into the engine in proximity to the rotating parts as soon as the engine stops.

Further, U.S. Pat. No. 2,919,103 (Schelp) discloses an arrangement for cooling the peripheral rim of a centripetal turbine wheel during operation so as to reduce the temperature range between operation and shut down. Also U.S. Pat. No. 3,286,461 (Johnson) discloses a turbine engine which is started by applying compressed air against the blade. Cooling is also provided during operation. U.S. Pat. No. 3,588,265 (Berry) discloses a computer used in maintaining predetermined temperatures in a turbine. However, in summary these devices are not completely satisfactory for reducing thermal stresses in the rotor.

SUMMARY OF THE INVENTION

The present invention provides for a turbine that reduces the steep thermal gradients and thus thermal stresses in the rotor, and also reduces the operational equilibrium temperature of the rotor, both reductions extending rotor life. In accordance with a preferred embodiment of the invention, there is provided a turbine comprising a combustor, and a rotor having a central disc with a peripheral rim, and a plurality of blades extending radially outwardly from the rim. The improvement comprises a duct arrangement in fluid communication with the combustor which includes at least one injector that directs gases from the combustor at the rim. An aspect of the duct arrangement includes a valve device for regulating the flow of gases from the compressor to the rim during the start-up period. The hot gases are directed at the rim to reduce the steep thermal gradient, and thus the thermal stresses at the junction of the blades and the rim.

As a further aspect of the invention, the turbine includes a compressor and the duct arrangement includes a valve in fluid communication with the compressor. The valve regulates the flow of gases from the compressor so that after start-up is complete, the gases from the compressor are directed through the injector at the rim to reduce the operational equilibrium temperature of the turbine.

Additional features and advantages of the invention will be set forth in, or apparent from, the detailed description of a preferred embodiment found hereinbelow.

DETAILED DESCRIPTION OF THE PREFERRED EMBODIMENTS

Figure 1:
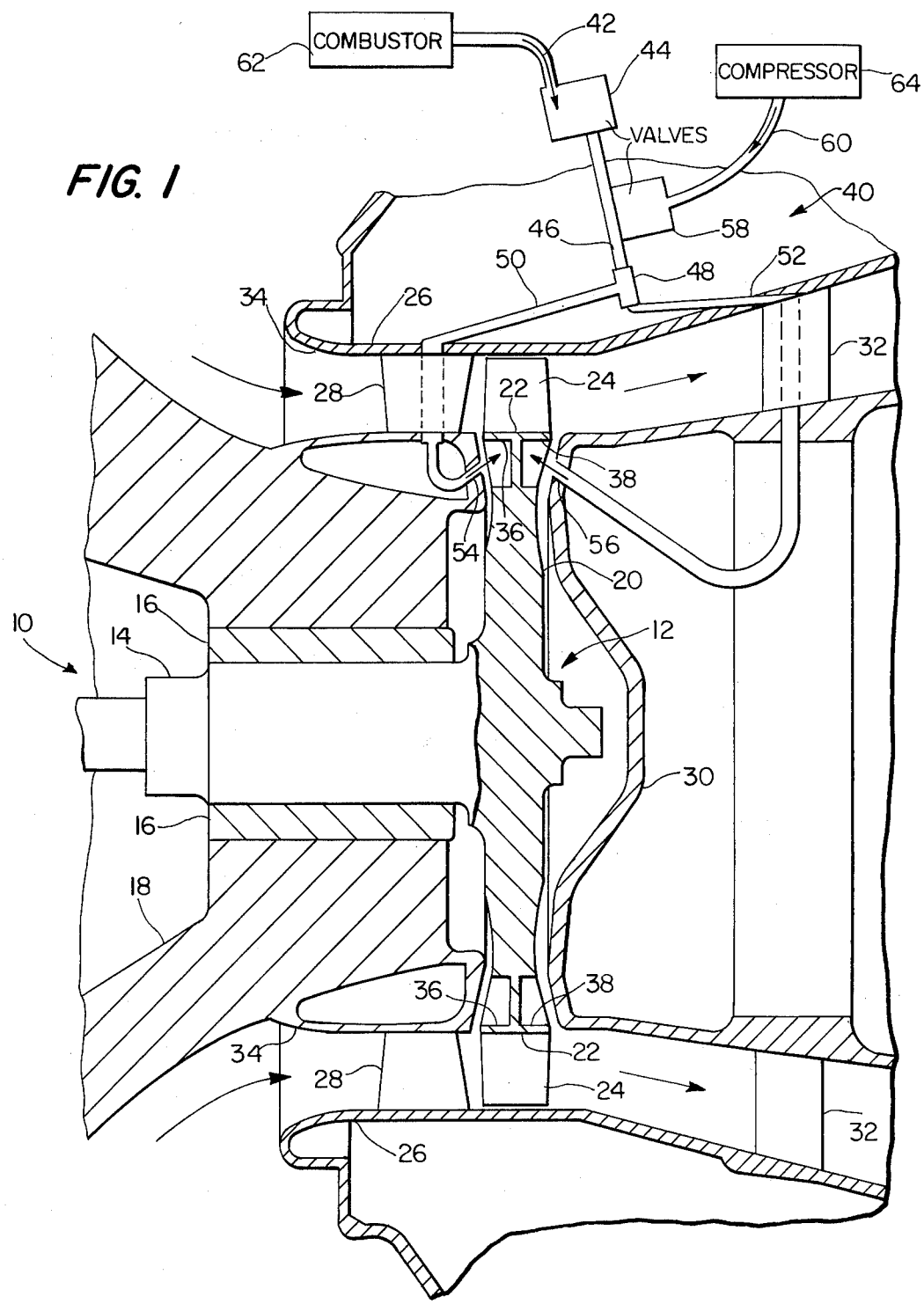
FIG. 1 is a cross-sectional side elevation of a turbine incorporating the invention.

With reference to FIG. 1, there is shown a preferred embodiment of the improved turbine of the invention, the turbine being generally denoted 10. The turbine 10 includes a rotor 12 mounted on a shaft 14, shaft 14 being mounted for rotation by bearings 16 on support frame 18. Turbine 10 further comprises a conventional combustor and a compressor, indicated schematically at 62 and 64, respectively.

Rotor 12 comprises a disc or hub 20, shown in FIG. 1 in section along a diameter thereof, and also has a rim 22, and a plurality of thin blades 24 extending outwardly from rim 22. In a preferred embodiment blades 24 are cast or forged integrally with disc 20. Each side of disc 20 is recessed adjacent rim 22 to expose forward underside 36 and aft underside 38 of rim 22.

Completely surrounding rotor 12 is a shroud 26 that is spaced apart from, and secured to, support frame 18 by a plurality of fixed hollow stator blades 28. Shroud 26 is also secured to an internal support member 30 of turbine 10 by a plurality of fixed hollow stator blades 32. A generally annular passageway 34 is defined between shroud 26 and support frame 18, passageway 34 serving to direct the main hot gas flow generated by combustor 62 (as indicated by arrows in FIG. 1) toward blades 24. In accordance with the invention, a duct arrangement, generally denoted 40, is provided for diverting hot, high pressure gases, bled from combustor 62 to the rim 22 of rotor 12. The duct arrangement 40 includes a first duct 42, through which hot, high pressure gases are bled from combustor 62 to a first flow control valve 44. In a preferred embodiment, the first flow control valve 44 includes either a passive, heat-actuated, bi-metallic valve operator, or a time delay device, for regulating the flow of hot gases through valve 44. A second duct 46 is connected to the outlet of flow control valve 44 and is, in turn, connected to a flow splitter 48. Flow splitter 48 divides the flow of gases, providing hot gases to a third duct 50 and a fourth duct 52. The third duct 50 extends through the hollow central portion of one of the stator blades 28 and through a hollow portion of support frame 18, as illustrated, and communicates with a forward bleed flow injector 54. Injector 54 is mounted on support frame 18 and positioned so as to direct hot gases toward the forward underside 36 of rim 22, as indicated by the arrow in FIG. 1. Similarly, duct 52 extends through the hollow central portion of one of the stator blades 32 and through a hollow portion of internal support member 30, and communicates with an aft bleed flow injector 56. Injector 56 is mounted in internal support member 30 and positioned so as to direct hot gases toward aft underside 38 of rim 22, as indicated by the arrow in FIG. 5.

As stated hereinabove, in accordance with a further aspect of the invention, cool gases from the compressor 64 are directed to the rim 22 to lower the operating temperatures of the rotor after start-up. To this end, duct arrangement 40 further includes a second flow control valve 58 in fluid communication with second duct 46 and a fifth duct 60 providing fluid communication between second flow control valve 58 and compressor 64 of turbine 10. Valve 58 regulates the flow of gases bled from compressor 64 and prevents hot, high pressure gases from entering duct 60, and thus from entering compressor 64.

The operation of the improved turbine of the invention will now be considered. Turbine combustor 62 is fired up, and hot, high pressure gases are directed through annular passageway 34 to impinge on blades 24 and thereby cause rotation of rotor 12. As blades 24 are thin, they quickly reach an equilibrium temperature. Simultaneous with the passage of hot gases through annular passageway 34, first flow control valve 44 is opened and hot gases are bled from combustor 62 through duct arrangement 40 to forward bleed flow injector 54 and aft bleed flow injector 56. Injectors 54 and 56 cause the hot gases to impinge on rim 22, and, in particular, on the forward and aft underside portions 36 and 38. This flow of hot gases continues for the duration of the start-up transient period, (which is on the order of 15 to 20 seconds in the preferred embodiment), until rim 22 and the peripheral portion of disc 20 reach an equilibrium, steady-state temperature. As noted hereinabove, first flow control valve 44 can comprise either a heat actuated valve operator or a time delay device and is designed to completely shut off the flow of hot bleed gases from combustor 62 once this equilibrium temperature is reached.

Subsequent to the initial start-up period, and after valve 44 has shut off the flow of hot gases to rim 22, cooling air from the compressor 64 is directed through second valve 58 to injectors 54 and 56 and thus to rim 22. This cooling air produces a rim operating equilibrium temperature of from 75 to 100° F lower than the rim operating equilibrium temperature of a corresponding prior art turbine. With the rim at a lower equilibrium temperature, the maximum allowable turbine inlet temperature (the temperature of the main flow of hot gases that impinges on the blades) can be increased. Alternatively, if the maximum allowable turbine inlet temperature is not increased, the benefit of this approach can be realized in the resulting extension of the maximum operable life of the rotor.

Figure 2:
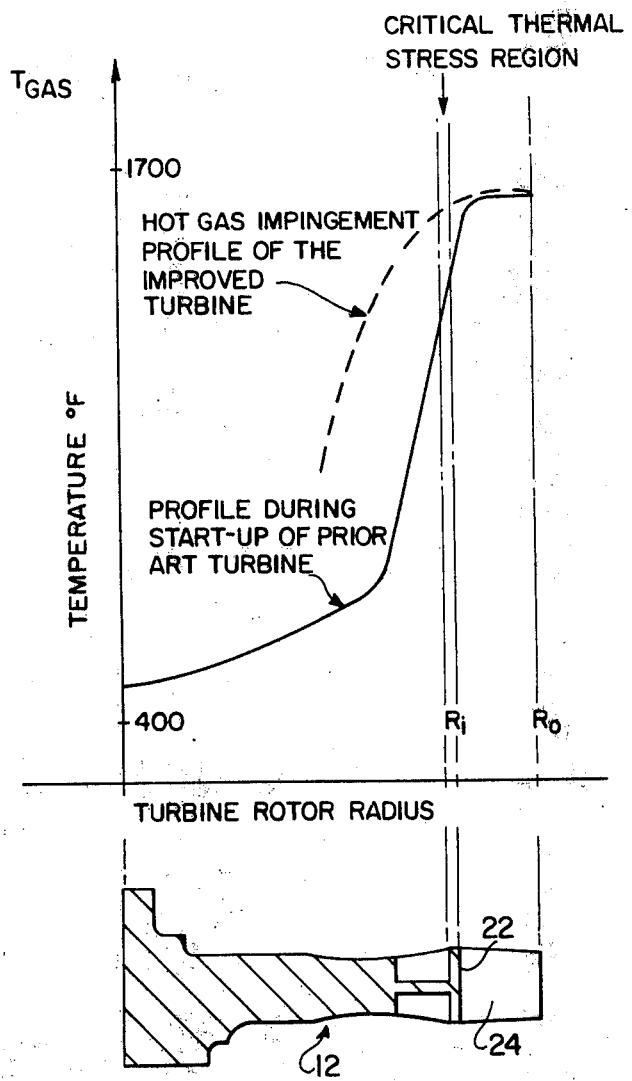
FIG. 2 is a graph depicting the temperature profile along the radius of the rotor of the turbine shown in FIG. 1.

Referring to FIG. 2, a graph is shown wherein the turbine rotor radius is indicated on the abscissa, and the temperature of the rotor during start-up is indicated on the ordinate. In particular, on the abscissa, two radii are indicated, $R_i$ indicating the radius to rim 22 and $R_o$ indicating the radius to the end of blade 24. These radii are clearly indicated on a section of rotor 12 depicted below and parallel to the abscissa. A critical thermal stress region is indicated on the graph which generally corresponds to the width of rim 22. The solid line of the graph of FIG. 2 indicates the temperature profile along rotor 12 during the start-up of a prior art turbine. The dotted line of the graph of FIG. 2 indicates the temperature profile of the improved turbine of the invention with hot gases impinging on rim 22. It will be seen that in the thermal stress region the improved turbine has a more gently sloping temperature profile, and consequently less thermal stress, than is evidenced by the more drastically downwardly sloping temperature profile of the prior art turbine. This results in an increase in the useful operating life of the turbine rotor.

It is noted that the invention, although of general application, is particularly applicable to gas turbines employed in vehicles since the number of cold starts of these turbines is very large when compared with aircraft turbines or stationary power turbines.

Although the present invention has been described relative to exemplary embodiments thereof, modifications and variations can be effected in these embodiments without departing from the scope and spirit of the invention.

I claim:

1. In a turbine comprising a combustor, a rotor having a central disc with a peripheral rim, a plurality of blades extending radially outwardly from said rim, and a flow path for a main flow of hot gases from the combustor to the turbine rotor, the improvement comprising: a duct arrangement bypassing said flow path and in fluid communication with said combustor for directing hot gases from said combustor to the under side of the rim of the rotor during turbine start up.

2. A turbine in accordance with claim 1 wherein said duct arrangement includes a flow control valve for regulating the flow of hot gases from the combustor.

3. A turbine in accordance with claim 2 and including temperature responsive means for actuating said flow control valve.

4. A turbine in accordance with claim 3 wherein said flow control valve includes a bimetallic member.

5. A turbine in accordance with claim 1 wherein a peripheral portion of each side of said central disc adjacent said peripheral rim is recessed to expose forward and aft undersides of said rim, and wherein said duct arrangement includes a plurality of injectors for directing hot gases toward said undersides of said rim.

6. A turbine in accordance with claim 1 wherein said central disc is tapered along radii extending from the center of said central disc, said peripheral rim extending orthogonally outwardly from the radii of said central disc and said peripheral rim having a forward underside and an aft underside, said duct arrangement including a plurality of injectors for directing hot gases toward said undersides of said rim.

7. A turbine in accordance with claim 2 wherein said duct arrangement includes a flow splitter located downstream from, and in fluid communication with, said flow control valve for dividing the flow of hot gases from said control valve into a first duct directed at the forward underside of said rim and into a second duct directed at the aft underside of said rim.

8. A turbine in accordance with claim 2 further including a shroud and a structure for supporting said rotor, said shroud being spaced apart from said supporting structure by a plurality of hollow stator blades, said shroud and said supporting structure defining therebetween an annular passageway adapted to receive a main flow of hot gases from said combustor, a portion of the duct arrangement extending through the hollow portion of said hollow stator blades.

9. A turbine in accordance with claim 2 further including a compressor, said duct arrangement including a further flow control valve, in fluid communication with said compressor, for controlling bleeding of cooling gases from said compressor to cool the underside of said rim.

10. A method for reducing the thermal stress in a rotor of a turbine, said rotor comprising a central disc with a peripheral rim and a plurality of blades extending radially outwardly from said rim, the turbine further including a combustor and a flow path for a main flow of hot gases from the combustor to the turbine rotor, said method comprising the steps of:

bleeding hot gases from the combustor of the turbine in bypass relation to said flow path, and directing the hot gases at the underside of the rim of said rotor during turbine start-up.

11. A method in accordance with claim 10 wherein the flow of hot gases from the combustor is terminated after the rim of the rotor has reached a steady-state temperature.

12. A method in accordance with claim 11 wherein said turbine further includes a compressor, and the method further comprises the step of bleeding cooling gases from the compressor and directing the cooling gases at the rim of the rotor after the flow of hot gases from the combustor is terminated.

* * * * *